US011113283B2

(12) United States Patent
Al-Kateb et al.

(10) Patent No.: US 11,113,283 B2
(45) Date of Patent: Sep. 7, 2021

(54) COST-BASED OPTIMIZATIONS FOR JOIN QUERIES WITH UNION ALL VIEWS AND DERIVED TABLES

(71) Applicant: Teradata US, Inc., Dayton, OH (US)

(72) Inventors: Mohammed Al-Kateb, Rolling Hills Estates, CA (US); Grace Kwan-On Au, Rancho Palos Verdes, CA (US); Rama Krishna Korlapati, El Segundo, CA (US); Lu Ma, Tenafly, NJ (US); Sanjay Nair, El Segundo, CA (US)

(73) Assignee: Teradata US, Inc., San Diego, CA (US)

( * ) Notice: Subject to any disclaimer, the term of this patent is extended or adjusted under 35 U.S.C. 154(b) by 398 days.

(21) Appl. No.: 15/844,685

(22) Filed: Dec. 18, 2017

(65) Prior Publication Data

US 2019/0188299 A1    Jun. 20, 2019

(51) Int. Cl.
*G06F 7/02* (2006.01)
*G06F 16/00* (2019.01)
*G06F 16/2453* (2019.01)
*G06F 16/2455* (2019.01)
*G06F 16/28* (2019.01)

(52) U.S. Cl.
CPC .... *G06F 16/24544* (2019.01); *G06F 16/2456* (2019.01); *G06F 16/283* (2019.01)

(58) Field of Classification Search
CPC ......... G06F 16/24544; G06F 16/24542; G06F 16/2456; G06F 16/24561; G06F 16/2462; G06F 16/283; G06F 16/284
See application file for complete search history.

(56) References Cited

U.S. PATENT DOCUMENTS

| 7,188,098 | B2   | 3/2007  | Chen et al. |
| 7,409,385 | B2   | 8/2008  | Lindsay et al. |
| 7,440,937 | B2 * | 10/2008 | Kiernan ............ G06F 16/24544 |
| 7,512,642 | B2   | 5/2009  | Antonio et al. |
| 7,533,087 | B2   | 5/2009  | Liu et al. |
| 7,539,667 | B2   | 5/2009  | Lindsay et al. |
| 8,280,869 | B1 * | 10/2012 | Burger ............. G06F 16/24561 |
|           |      |         | 707/706 |
| 2006/0064407 | A1 | 3/2006 | Santosuosso |
| 2007/0219969 | A1 * | 9/2007 | Su .................... G06F 16/24544 |
| 2009/0006346 | A1 * | 1/2009 | C N .................. G06F 16/24542 |

(Continued)

OTHER PUBLICATIONS

White, Paul, "Union All Optimization," SentryOne, taken from https://sqlperformance.com/2017/05/sql-plan/union-all-optimization (Year: 2017).*

(Continued)

*Primary Examiner* — Bruce M Moser
(74) *Attorney, Agent, or Firm* — Gates & Cooper LLP (57) ABSTRACT

A query having a Union All view is identified. A logical join between Union AH view/derived table and other tables is broken down into multiple physical joins. The physical joins are pushed to the branches. Cost-based processing statistics are obtained for the branches. An optimal plan for the joins is selected based on the statistics; representing an optimal query execution for the query. The optimal query execution plan is provided to a database engine for executing the optimal query execution plan against a data warehouse.

19 Claims, 8 Drawing Sheets

(56) References Cited

U.S. PATENT DOCUMENTS

2015/0234888 A1* 8/2015 Ahmed ............. G06F 16/24535
       707/765
2018/0307728 A1* 10/2018 Crupi ................ G06F 16/24553

OTHER PUBLICATIONS

Calbimonte, Daniel, "3 Ways to Improve T-SQL Performance," SQLShack, taken from https://www.sqlshack.com/3-ways-to-improve-t-sql-performance/ (Year: 2016).*

* cited by examiner

COST-BASED OPTIMIZATIONS FOR JOIN QUERIES WITH UNION ALL VIEWS AND DERIVED TABLES

BACKGROUND

To combine data from multiple tables or query results, a view can be defined on top of these tables/results to form a single logical table. The view is defined with a Data Manipulation Language (DML) "UNION ALL" (UA) set operation. Each table or result set represents a branch in the UA view. A branch can correspond to a single table or a query result (e.g., aggregation on a table and join between tables). There are many applications for UA views. One example is when there is a fact table in an existing system that grows too big. Another fact table may be defined as an extension to that large table. When a query is issued against the fact table, it needs to access both tables (the old and the new fact tables) as one table. The way these two tables are combined is by defining a UA view on them. Another example is with big data ecosystems, in which current data of an application may be stored in a table on the Teradata® Database and history data is stored on a remote Hadoop server. Data from local and remote systems can be combined using UA views. Yet, another example is with the features on the roadmap for the Teradata® Database, such as Multi Hash Map (MHM) and Multi Maps per Table (MMT). With these features, it is likely to have a scenario in which more than one table (e.g., on different MAPs) have to be combined in a UA view. These views then participate in different kind of queries such as aggregations and joins.

Existing approaches to process join queries involving UA views is straightforward. With one approach, all branches of the view are spooled first in a common spool. Then the resulting spool is joined with other tables in the query. This approach, however, can impact the performance of the database to a great extent for the following reasons. First, the cost of spooling all branches can be prohibitively expensive. This can be the case if, for example, the branches are retrieved from multiple large fact tables with millions/billions of rows. Second, the cost of joining the large spool with other tables (e.g., dimension tables) can be excessively costly as well. Both reasons cause poor query performance. With another approach, joins can be pushed into UA views with rule-based optimizations. But rule-based optimizations are always limited to specific scenarios covered by rewrite rules. This, in turn, often results in suboptimal join plans.

Consequently, although UA views are becoming more popular with database customers, customers are increasing complaining about performance issues associated with generating the UA views.

SUMMARY

Cost-based optimization processing for join queries with UA views is presented.

In an embodiment, a method for cost-based optimization for processing for join queries with UA views is provided. A query with a Union All (UA) operation is identified. Cost-based processing statistics for branches of the UA operation are obtained. Next, permutations of joins that satisfy the UA operation for the query are generated and a total cost is assigned to each permutation using the cost-based processing statistics. Finally, a select one of the permutations having a least total cost as an optimal query execution plan is provided to a database engine for executing the query against a database.

DETAILED DESCRIPTION

Various embodiments depicted herein are implemented as one or more software modules, which are programmed within memory and/or non-transitory computer-readable storage media and executed on one or more processing devices (having memory, storage, network connections, one or more processors, etc.).

As used herein, the terms and phrases "database," and "data warehouse" may be used interchangeably and synonymously. That is, a data warehouse may be viewed as a collection of databases or a collection of data from diverse and different data sources that provides a centralized access and federated view of the data from the different data sources through the data warehouse (may be referred to as just "warehouse").

As used herein a "view" is a searchable database object defined by user using a "Create View" command or defined as a derived table in a query. It may be viewed as a "virtual table" that can combine data from two or more tables, using joins or set operations, such as Union All, and can contain subsets of information needed for satisfying the query.

As used herein, a "UA view" can include a view or a derived table that uses a Union ALL operation.

A novel and new optimization technique is provided herein to mitigate processing performance issues associated with UA views. In an embodiment, the processing technique breaks down a logical join having a UA view into multiple physical joins with each UA processing branch. Pushing joins to UA processing branches opens up opportunity for more optimal query execution plans because there is more accurate statistics on the branches, using join indexes (JIs) and aggregate join indexes (AJIs), and utilizing a primary index/unique secondary index/non-unique secondary index (PI/USI/NUSI) and partitioning expressions. Each physical query plan costs a binary join between the pushed relation and a UA branch. Each of these individual joins is executed using the best join method having the lease execution costs. The result of all physical joins is then written to a common spool.

The presented optimization has the following advantages over conventional query rewriting approaches. First, the technique is a cost-based optimization. Hence, the technique is not limited to rule-based rewrites. This allows the optimizer to use the plan generated by the new optimization as an option to execute the query. The technique compares a newly devised plan with a default plan (which spools all branches first) and chooses the best plan. Second, binary join planning decides on join ordering in a cost-based fashion. Hence, the join order with a UA view is based on the optimal join path. This allows the table connected to the UA view to join with other relations first if such a join can reduce the number of rows to join with the UA view. Third, the novel optimization is flexible enough to apply when the branches of the UA view are all base tables or if some branches are base tables and the others are not, "Non-base table branches" mean that the branch has to spool its result first before being processed. This can be the case, for instance, when the branch is an aggregation on a table or a join between two tables. Additionally; the novel optimization is generally applicable and implementable in a variety of database systems.

Figure 1A:
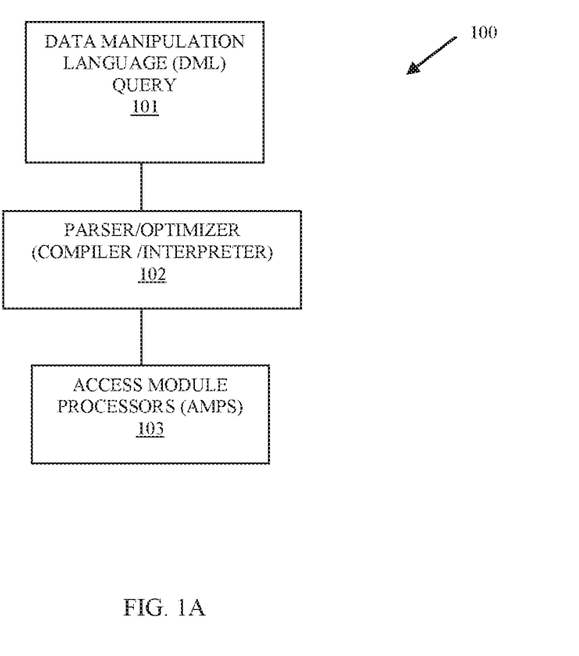
FIG. 1A is a diagram of a system for cost-based optimization processing for join queries with UA views, according to an embodiment.

FIG. 1A is a diagram of a system 100 for cost-based optimization processing for join queries with UA views, according to an embodiment.

The system 100 is shown in greatly simplified form with just those components necessary for comprehension of embodiments of the invention presented. It is to be understood that additional components or subcomponents may be used without departing from the teachings presented herein.

The system 100 includes a Data Manipulation Language (DML) (such as Structured Query Language (SQL)) query 101 (herein after just "query 101," a parser/optimizer (compiler/interpreter) 102 (herein after just "optimizer 102"), and Access Module Processors (AMPs—that execute instructions against the database).

The query 101 can be issued and/or originate from an automated process (application or script) within the warehouse/database (such as through schedule reports, etc.) or can be issued and/or originate from an end-user (such as a Database Administrator (DBA) or Data Analyst) through a user-interface to the warehouse/database.

The optimizer 102 translates or interrupts the query 101 into a set of optimal instructions that the AMPs process against the warehouse. A query execution plan is produced by the optimizer 102. The optimizer 102 implements the novel cost-based optimization for join queries with UA views by identifying the optimal (least expensive) join instruction ordering for the query. The optimizer 102 does not re-write the query; rather, permutations of the possible join orders are broken out and are costed out in alternative query execution plans and the most cost effective (optimal) plan is selected for processing the query by the AMPs 103.

The processing performed by the optimizer 102 is described within the context of a sample query 101 that utilizes a UA view. Three different options can be performed by the optimizer 102 when costing out the plans for the query 101. These options are shown in the FIGS. 1B-1D.

It is to be noted, that the query 101 presented can be more complex than what is illustrated and is presented for comprehending the processing of the optimizer 102. Therefore, embodiments presented herein are not limited to the query 101 illustrated below as an example query 101. Accordingly, any query 101 that utilizes the UA view in any DML can benefit from the processing of the optimizer 102 presented herein.

Consider the following example tables (t1-t4) defined as follows:
t1(a1 int, b1 int, c1 int, d1 int)
t2(a2 int, b2 int, c2 int, d2 int)
t3(a3 int, b3 int, c3 int, d3 int)
t4(a4 int, b4 int, c4 int, d4 int)
where "int" is an Integer data type, and a1-a4, b1-b4, c1-c4, and d1-d4 are columns defined in the corresponding tables (t1-t4).

The sample query 101 is presented as follows:
SELECT a1,a2,a
FROM t1,t2, (SELECT a3 from t3 where b3=3
UNION ALL
SELECT a4 from t4 where b4=4) UAV(a)
WHERE c1=c2 and d1=a;
where the query 101 is provided in a Structured Query Language (SQL) syntax representing on type of DML.

Existing approaches to this query 101 entail executing the branches of the UA view and writing results into a common spool. Then, the common spool is joined with t1 and t2 by the best join method (least expensive based on database statistics/metrics for the tables) and order chosen by the conventional optimizer. The resulting execution plan produced is as follows: first rows are retrieved from t3 and t4 and written into a first spool, which is sorted in a second spool. The second spool is then joined with t1 and the result is written into a third spool. Finally, the third spool is joined with t2 to generate the final result. This traditional approach, however, can perform poorly when the size of t3 and t4 (after applying single table conditions) is too big, such that the cost of writing the common spool can be processor intensive (expensive) and cost of joining the large spool with other tables in the query can be extremely costly as well.

The optimizer 102 solves these inherent performance issues with novel optimization processing for join queries over UA views. The optimizer 102 breaks down the join with a UA view into multiple independent join processing steps. Each individual join step joins one or more branches of the UA view. The result of all join processing steps are output to a common spool.

Figure 1B:
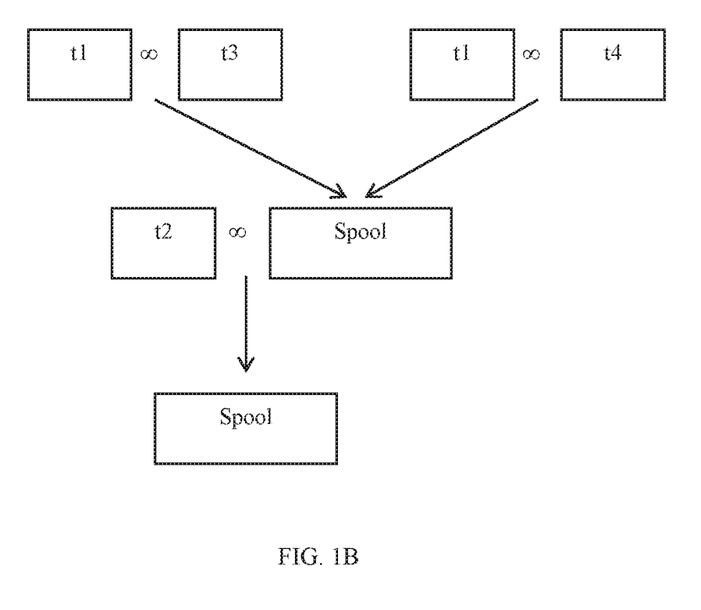
FIG. 1B is a diagram illustrating a first option for cost-based optimization processing for join queries with UA views for an example query, according to an example embodiment.

A first option for the optimization is presented in the FIG. 1B. The optimizer 102, in option 1 (FIG. 1B), joins t1 with each of the branches in two different and independent join steps. The result of these two joins are spooled and the spool is joined with t2 with the final result returned in a second spool.

A summarized version of an EXPLAIN statement for option 1 for the optimizer's processing proceeds as follows:
1) The optimizer executes the following steps in parallel.
   1) An all-AMPs 103 RETRIEVE step from Integrated Data Repository (IDR) IDR.t1 by way of an all-rows scan with a condition of ("(NOT (IDR.t1.c1 IS NULL)) AND (NOT (IDR.t1.d1 IS NULL))") into Spool 3 (all_amps), which is redistributed by the hash code of (IDR.t1.d1) to all AMPs 103. Then, the optimizer 102 does a SORT to order Spool 3 by row hash.
   2) An all-AMPs 103 RETRIEVE step from IDR.t2 by way of an all-rows scan with a condition of ("NOT (IDR.t2.c2 IS NULL)") into Spool 4 (all_amps), which is redistributed by the hash code of (IDR.t2.c2) to all AMPs 103. Then, the optimizer does a SORT to order Spool 4 by row hash.

2) An all-AMPs 103 JOIN step from Spool 3 by way of a RowHash match scan, which is joined to IDR.t3 by way of a RowHash match scan with a condition of ("IDR.t3.b3=3"). Spool 3 and IDR.t3 are joined using a merge join, with a join condition of ("d1=IDR.t3.A"). The result goes into Spool 5 (all_amps), which is redistributed by the hash code of (IDR.t1.c1) to all AMPs 103.

3) An all-AMPs 103 JOIN step from Spool 3 (Last Use) by way of a RowHash match scan, which is joined to IDR.t4 by way of a RowHash match scan with a condition of ("IDR.t4.b4=4"). Spool 3 and IDR.t4 are joined using a merge join, with a join condition of ("d1=IDR.t4.A"). The result goes into Spool 5 (all_amps), which is redistributed by the hash code of (IDR.t1.c1) to all AMPs 103.

4) An all-AMPs JOIN step from Spool 4 (Last Use) by way of a RowHash match scan, which is joined to Spool 5 (Last Use) by way of a RowHash match scan. Spool 4 and Spool 5 are joined using a merge join, with a join condition of ("c1=c2"). The result goes into Spool 2 (group_amps), which is built locally on the AMPs 103.

Figure 1C:
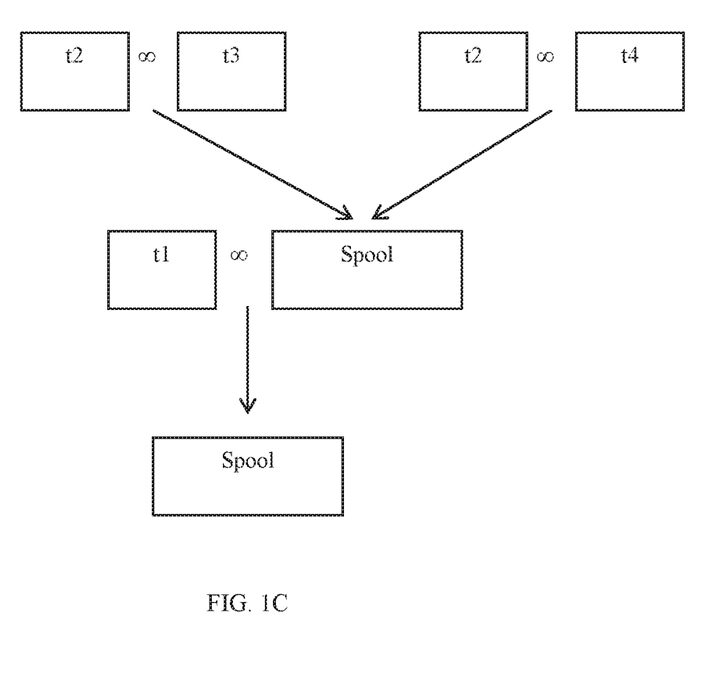
FIG. 1C is a diagram illustrating a second option for cost-based optimization processing for join queries with UA views for the example query, according to an example embodiment.

A second option for the optimization is presented in the FIG. 1C. The optimizer 102, in option 2 (FIG. 1C), performs similar processing as that which was discussed in option 1 of the FIG. 1B, except in option 2, the optimizer 102 joins t2 with the UA branches and joins the result in a spool with t1.

A summarized version of an EXPLAIN statement for option 2 for the optimizer's processing proceeds as follows:
1) The optimizer 102 executes the following processing steps in parallel.
  1) An all-AMPs 103 RETRIEVE step from IDR.t3 by way of an all-rows scan with a condition of ("(NOT (IDR.t3.a IS NULL)) AND (IDR.t3.b3=3)") into Spool 3 (all_amps), which is built locally on the AMPs 103.
  2) An all-AMPs RETRIEVE step from IDR.t2 by way of an all-rows scan with a condition of ("NOT (IDR.t2.c2 IS NULL)") into Spool 4 (all_amps), which is duplicated on all AMPs 103.
  3) An all-AMPs 103 RETRIEVE step from IDR.t4 by way of an all-rows scan with a condition of ("(NOT (IDR.t4.a IS NULL)) AND (IDR.t4.b4=4)") into Spool 5 (all_amps), which is built locally on the AMPs 103.
2) An all-AMPs 103 JOIN step from Spool 3 (Last Use) by way of an all-rows scan, which is joined to Spool 4 by way of an all-rows scan. Spool 3 and Spool 4 are joined using a product join, with a join condition of ("(1=1)"). The result goes into Spool 6 (all_amps), which is duplicated on all AMPs 103.
3) An all-AMPs 103 JOIN step from Spool 5 (Last Use) by way of an all-rows scan, which is joined to Spool 4 (Last Use) by way of an all-rows scan. Spool 5 and Spool 4 are joined using a product join, with a join condition of ("(1=1)"). The result goes into Spool 6 (all_amps), which is duplicated on all AMPs 103.
4) An all-AMPs 103 JOIN step from Spool 6 (Last Use) by way of an all-rows scan, which is joined to IDR.t1 by way of an all-rows scan with a condition of ("NOT (IDR.t1.d1 IS NULL)"). Spool 6 and IDR.t1 are joined using a dynamic hash join, with a join condition of ("(IDR.t1.d1=A) AND (IDR.t1.c1=c2)"). The result goes into Spool 2 (group_amps), which is built locally on the AMPs 103.

Figure 1D:
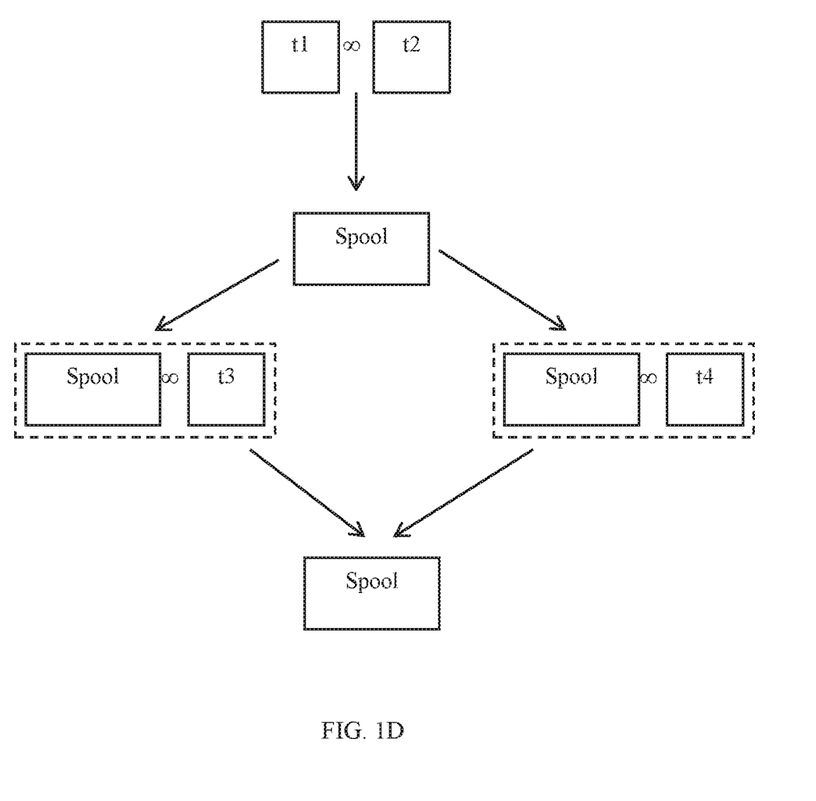
FIG. 1D is a diagram illustrating a third option for cost-based optimization processing for join queries with UA views for the example query, according to an example embodiment.

A third option for the optimization is presented in the FIG. 1D. The optimizer 102, in option 3 (FIG. 1D), joins t1 and t2 and the result of the join is spooled where it is joined with each of the branches in the UA view.

A summarized version of an EXPLAIN statement for option 2 for the optimizer's processing proceeds as follows:
1) The optimizer 102 executes the following processing steps in parallel.
  1) An all-AMPs 103 RETRIEVE step from IDR.t1 by way of an all-rows scan with a condition of ("(NOT (IDR.t1.c1 IS NULL)) AND (NOT (IDR.t1.d1 IS NULL))") into Spool 3 (all_amps), which is duplicated on all AMPs 103,
  2) An all-AMPs 103 RETRIEVE step from IDR.t2 by way of an all-rows scan with a condition of ("NOT (IDR.t2.c2 IS NUM") into Spool 4 (all_amps), which is built locally on the AMPs 103.
  3) An all-AMPs 103 RETRIEVE step from IDR.t3 by way of an all-rows scan with a condition of ("(NOT (IDR.t3.a IS NULL)) AND (IDR.t3.b3=3)") into Spool 5 (all_amps), which is built locally on the AMPs 103.
2) An all-AMPs 103 JOIN step from Spool 3 (Last Use) by way of an all-rows scan, which is joined to Spool 4 (Last Use) by way of an all-rows scan. Spool 3 and Spool 4 are joined using a product join, with a join condition of ("c1=c2"). The result goes into Spool 6 (all_amps), which is duplicated on all AMPs 103.
3) An all-AMPs 103 JOIN step from Spool 5 (Last Use) by way of an all-rows scan, which is joined to Spool 6 by way of an all-rows scan. Spool 5 and Spool 6 are joined using a product join, with a join condition of ("d1=A"). The result goes into Spool 2 (group_amps), which is built locally on the AMPs 103.
4) An all-AMPs 103 JOIN step from IDR.t4 by way of an all-rows scan with a condition of ("IDR.t4.b4=4"), which is joined to Spool 6 (Last Use) by way of an all-rows scan. IDR.t4 and Spool 6 are joined using a product join, with a join condition of ("d1=IDR.t4.A"). The result goes into Spool 2 (group_amps), which is built locally on the AMPs 103, The AMPS 103 are essentially the warehouse engine (database engine) that process the instructions (selected query execution plan) provided and produced by the optimizer 102 on one or more physical nodes (computing devices with processors, memory, storage) of a network for the warehouse.

The novel processing provided by the optimizer 102 is a cost-based approach that distinguishes over the traditional rule-based optimizations that are normally done in the form of query re-write rules. Rule-based optimizations are limited to specific scenarios covered by the rules. For example, join pushing as part of query re-writes but it is limited to very specific cases such as PK-FK relationship. Because the processing of the optimizer 102 is cost-based, all possible join plans that can be generated by the optimizer 102 are considered and compared. The best plan is finally chosen. The new optimization technique chooses the best overall plan to generate the join result and, for each individual join, it chooses the best join plan for each branch. For example, a merge join can be chosen to join with one branch while a dynamic hash join can be used to join with another branch. As the joins between the corresponding branches and the other relations are planned independently and the best join methods are chosen for them, the overall cost of the plan generated by this new optimization is much lower than the traditional query re-write approaches.

Moreover, the optimizer 102 can push a single table or a join between tables to the UA branches. This is another unique attribute of the cost-based optimization processing performed by the optimizer 102, which cannot be achieved with rule-based optimizations. That is, if a less costly plan entails pushing a single table to the UA branches and then joining the result with other tables outside the UA view, the optimizer 102 maintains and keeps this plan. Further, if it is less costly to join some of the tables first and then push the join result to the UA branches, the optimizer 102 selects such a plan.

Additionally, the optimizer 102 provides geography-based adjustments for the relation (i.e., base table or join result) that is being joined on the branches of the UA view. Consider for instance, option 3 of the FIG. 1D. In option 3, the result of joining t1 and t2 is joined with both branches in the UA view. In other words, the result of t1 ∞ t2 is needed twice. Once to join with t3 and once to join with t4. The naïve approach to deal with this, is to do the join t1 ∞ t2 twice—each time producing the result in the geography appropriate for joining with the corresponding branch. In the running example (presented herein and above), the geography t1 ∞ t2 needs to be duped for joining both branches, but doing the join twice is unnecessary and not optimal, Accordingly, the optimizer 102 is configured with an algorithm that adjusts the geography of the relation being joined with the UA branches. As can be seen from the example plan for option 3 (FIG. 1D), the result t1 ∞ t2 is duplicated in one of the spools once to join with t3. The algorithm then adjusts the geography of that spool to be accessed directly for the join with t4.

The algorithm (processed by the optimizer 102) also adjusts the order of joins between the outer relation and the branches as part of the geography adjustment process. For example, assume that to join with the first branch ((t1 ∞ t2) ∞ t3), the result t1 ∞ t2 needs to be duplicated, and to join with the second branch ((t1 ∞ t2) ∞ t4), the result of t1 ∞ t2 needs to be redistributed. In this case, the geography adjustment algorithm decides to do the ((t1 ∞ t2) ∞ t4) first. Then, the algorithm duplicates the hashed spool of t1 ∞ t2 to prepare for the join of (t1 ∞ t2) with t3. Note that if the relation being pushed is a base table with single table conditions, then those conditions will be applied once when the base table is spooled for the first join and the spool with the reduced number of rows can be used for the following joins to improve performance even further.

These geography and sequence adjustments take place as part of generating different join plans with the newly presented cost-based optimization technique, and the cost of all adjustments is factored out in the final cost of each plan produced by the optimizer 102. In this way, the optimizer 102 has an accurate estimation upon which the optimizer 102 can decide/select the most optimal plan for execution of the query 101 by the AMPS 103.

Figure 1E:
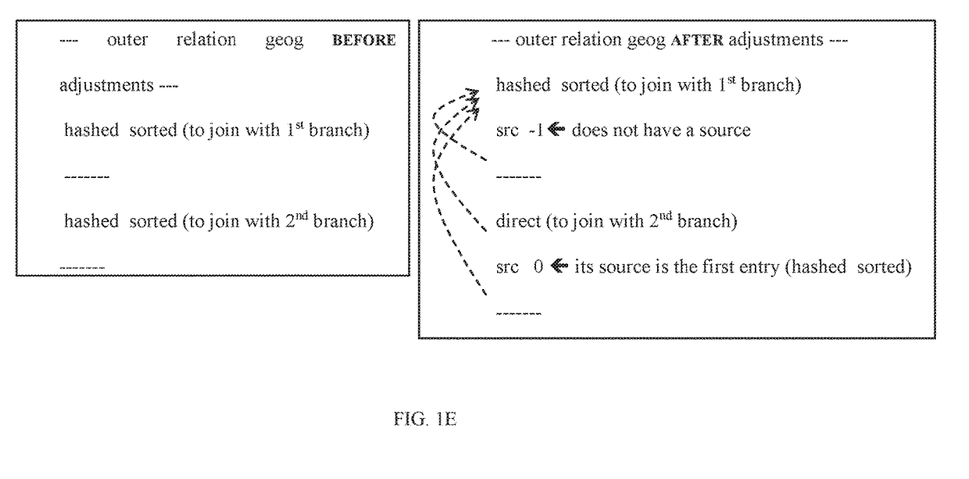
FIG. 1E is a diagram of an example geography-based and cost adjustment algorithm processed with the cost-based optimization processing for join queries with UA views for the example query, according to an example embodiment.

Example pseudo code that the optimizer 102 processes for adjusting geography and cost is provided as follows:
1. for every branch $b_i$ in the UA view:
   1.1. calculate the join cost for $b_i$
   1.2. update the total join cost calculated so far
   1.3. if the outer relation geog for $b_i$ is identical to that of branch $b_j$ (j !=i)
      1.3.1. change $b_i$'s outer relation geog to direct
      1.3.2. make $b_j$'s outer relation as the source of $b_i$'s outer relation
      1.3.3. adjust the total join cost calculated so far to reflect geog adjustment
   1.4. else if $b_i$'s outer relation can use $b_j$'s outer relation as source
      1.4.1. make $b_j$'s outer relation as the source of $b_i$'s outer relation
      1.4.2. adjust the total join cost calculated so far to reflect the change in source
   1.5. else if $b_i$'s outer relation can be used as a source of $b_j$'s outer relation
      1.5.1. make $b_i$'s outer relation as the source of $b_j$'s outer relation
      1.5.2. adjust the total join cost calculated so to reflect the change in source The FIG. 1E presents an illustration of geography adjustment by the algorithm assuming a join query with UA view that has four branches. As can be seen, before geography adjustment for the outer relation, the outer relation has hash sorted geography when joining with branches. After adjustment, only the geography of outer relation joining with first branch remains hash sorted. The geography of outer relation to join with remaining branches is changed to direct geography and its source comes from the outer relation joining with first branch.

The optimizer 102 also supports early termination during join planning. The base plan (with no binary join push) is costed out first based on the database statistics. While planning and costing the join push, the optimizer 102 accumulates the total cost of joining branches. If, at any point, the total cost exceeds the base plan cost, the optimizer 102 terminates and selects the base plan as the most cost-effective plan. This early termination reduces the parsing time and optimizes system resource usage (processor, memory, storage). One example is when the branches are small tables, here, the cost of pushing joins is likely worse than the default non-pushed plan and early termination will be pursued by the optimizer 102.

Still further, the optimizer 102 also works on a binary join level, which existing optimizations technique cannot do. The join between the UA relation and other relations in the query 101 is broken down into multiple processing steps. This is a single dimension. Each of these join steps can itself be executed as multiple steps in cases where the query qualifies for a multi-step join (Partial Redistribution Partial Duplication (PRPD) plans, 2-step Column Partition (CP) joins, etc.). This is a second dimension, 2-step CP join or PRPD plans can itself use a multi-step join, such as nested joins. This is another dimension, which can be repeated for supporting multiple additional dimensions. As such, the optimizer 102 supports multidimensional plans.

These and other embodiments are now discussed with reference to the FIGS. 2-4.

Figure 2:
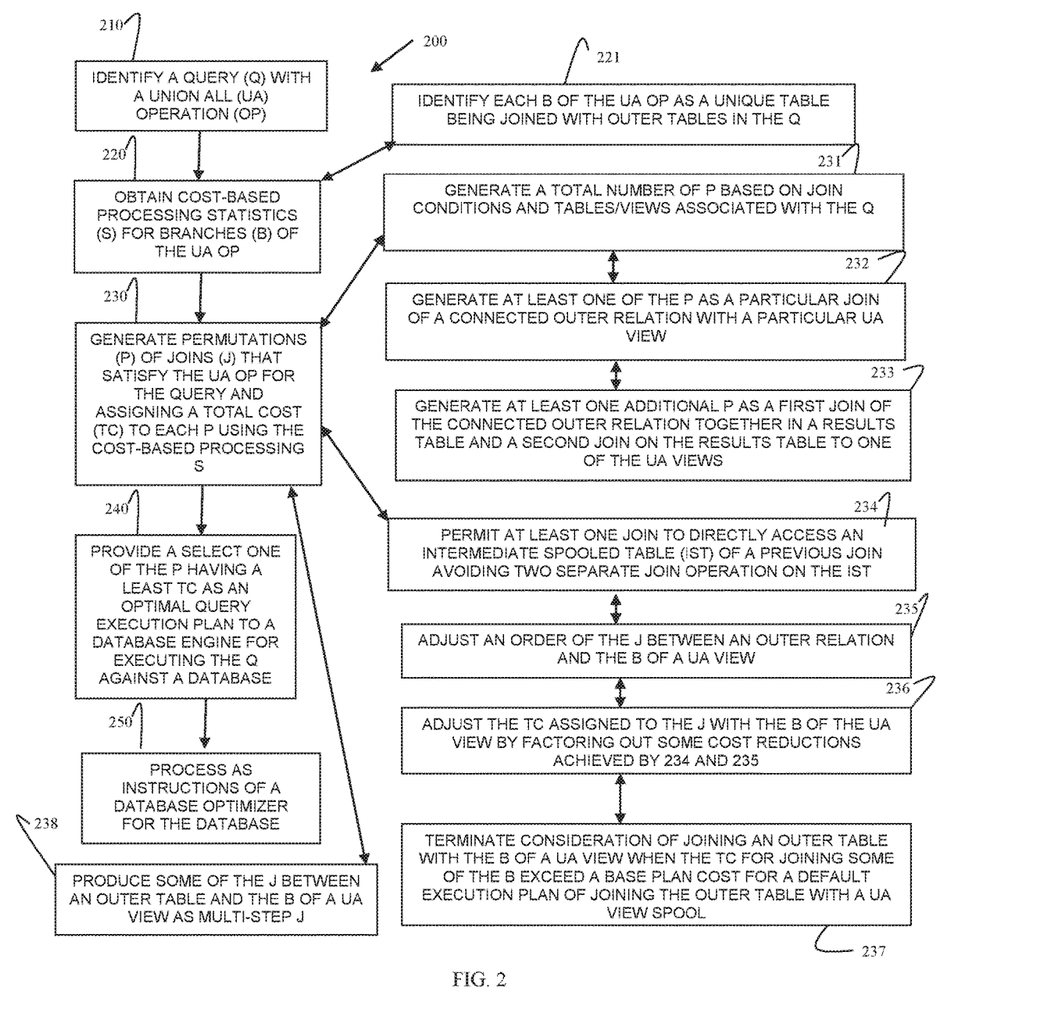
FIG. 2 is a diagram of a method for cost-based optimization processing for join queries with UA views, according to an example embodiment.

FIG. 2 is a diagram of a method 200 for cost-based optimization processing for join queries with UA views, according to an example embodiment. The method 200 is implemented as one or more software modules referred to as a "UA cost-based manager"). The UA cost-based manager is executable instructions that are programmed within memory or a non-transitory computer-readable medium and executed by one or more hardware processors. The UA cost-based manager has access to one or more network connections during processing, which can be wired, wireless, or a combination of wired and wireless.

In an embodiment, the UA cost-based manager is implemented within a data warehouse across one or more physical devices or nodes (computing devices) for execution over a network connection.

In an embodiment, the UA cost-based manager is the query optimizer 102.

In an embodiment, the UA cost-based manager performs, inter alia, the processing discussed above with the FIGS. 1A-1E.

At 210, the UA cost-based manager identifies a query with a UA operation. A DML parser provides the elements of the query to the UA cost-based manager and the UA cost-based manager identifies the elements associated with the UA operation.

At 220, the UA cost-based manager obtains cost-based processing statistics for branches of the UA operation.

In an embodiment, at 221, the UA cost-based manager identifies each branch of the UA operation as unique table being joined with outer tables in the query.

At 230, the UA cost-based manager generates permutations of joins that satisfy the UA operation for the query. The UA cost-based manager also assigns a total cost to each permutation using the cost-based processing statistics.

In an embodiment, at 231, the UA cost-based manager generates a total number of permutations based on the join conditions and tables/views associated with or present in the query.

In an embodiment of 231 and at 232, the UA cost-based manager generates at least one of the permutations as a particular join of a connected outer relation with a particular UA view.

In an embodiment of 232 and at 233, the UA cost-based manager generates at least one additional permutation as a first join of the connected outer relation together in a results table and a second join on the results table to one of the UA views.

In an embodiment, at 234, the UA cost-based manager permits at least one join to directly access an intermediate spooled table of a previous join for avoiding two separate join operations with the intermediate spooled table. This embodiment was discussed as the geography-based adjustment with the FIG. 1E above.

In an embodiment of 234 and at 235, the UA cost-based manager adjusts an order of the join between an outer relation and the branches of a UA view. This embodiment was also discussed as the geography and cost-based adjustments with the FIG. 1E above.

In an embodiment of 235 and at 236, the UA cost-based manager adjusts the total costs assigned to the joins with the branches of the UA view by factoring out some cost reductions achieved by the processing at 234 and 235.

In an embodiment of 236 and at 237, the UA cost-based manager terminates consideration of joining an outer table with the branches of a UA view when the total cost for joining some of the branches exceed a base plan cost for a default execution plan of joining the outer table with a UA view spool.

In an embodiment, at 238, the UA cost-based manager produces some of the joins between an outer table and the branches of a UA view as a multi-step join. This was discussed above with the FIGS. 1A-1E as support for multiple dimensions.

At 240, the UA cost-based manager provides a select one of the permutations. The selected permutation has a least total cost relative to all of the total costs and the selected permutation is provided as an optimal query execution plan to a database engine for executing the query against a database.

In an embodiment, at 250, the UA cost-based manager processes as an enhancement to an existing query/database optimizer for the database support cost-based optimization for join queries with UA views.

Figure 3:
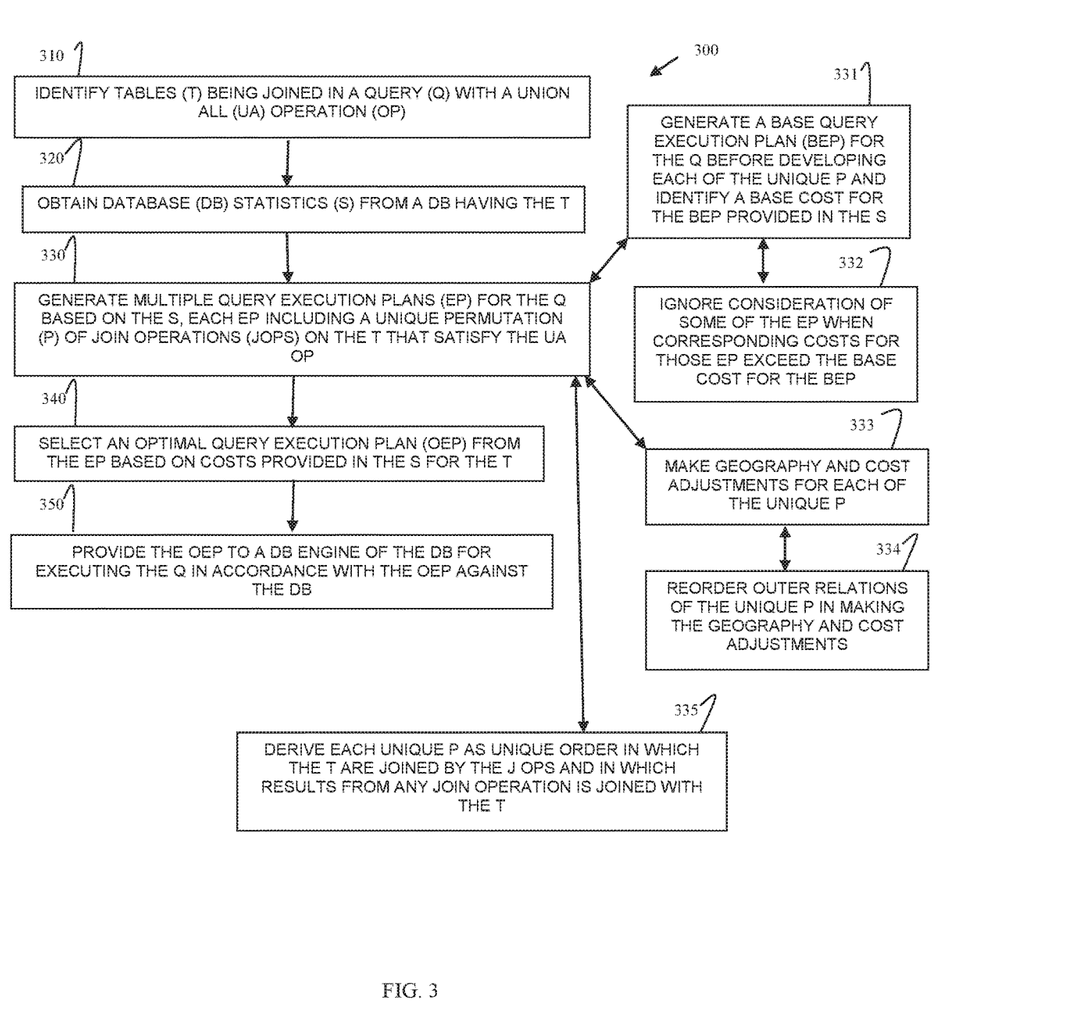
FIG. 3 is a diagram of another method for cost-based optimization processing for join queries with UA views, according to an example embodiment.

FIG. 3 is a diagram of another method 300 for cost-based optimization processing for join queries with UA views, according to an example embodiment. The method 300 is implemented as one or more software modules referred to as a "UA execution plan selector". The UA execution plan selector is executable instructions that are programmed within memory or a non-transitory computer-readable medium and executed by one or more hardware processors. The UA execution plan selector has access to one or more network connections during processing, which can be wired, wireless, or a combination of wired and wireless, The UA execution plan selector presents another and in some ways enhanced perspective of the processing discussed above with the FIGS. 1A-1E and 2.

In an embodiment, the UA execution plan selector is all or some combination of: the optimizer 102 and/or the method 200.

At 310, the UA execution plan selector identifies tables (branches) being joined in a query with a UA operation.

At 320, the UA execution plan selector obtains database statistics (costs) from a database having the tables, At 330, the UA execution plan selector generates multiple query execution plans for the query based on the database statistics (costs). Each of the multiple query execution plans including a unique permutation of join operations on the tables that satisfy the UA operation for the query.

In an embodiment, at 331, the UA execution plan selector generates a base query execution plan for the query before developing each of the unique permutations, and the UA execution plan selector establishes a base cost for the base query execution plan provided in the database statistics.

In an embodiment of 331 and at 332, the UA execution plan selector ignores consideration of some of the multiple query execution plans when corresponding costs for those multiple query execution plans exceed the base cost for the base query execution plan.

In an embodiment, at 333, the UA execution plan selector makes geography and cost adjustments for each of the unique permutations. Again, this was discussed above with the FIG. 1E.

In an embodiment of 333 and at 334, the UA execution plan selector reorders outer relations of the unique permutations in making the geography and cost adjustments.

In an embodiment, at 335, the UA execution plan selector derives each unique permutation as a unique order in which the tables are joined by the join operations and in which results from any join operation is joined with the tables.

At 340, the UA execution plan selector selects an optimal query execution plan from the multiple query execution plans based on costs provided in the database statistics for the tables.

According to an embodiment, at 350, the UA execution plan selector provides the optimal query execution plan to a database engine for executing the query in accordance with the optimal query execution plan against the database.

Figure 4:
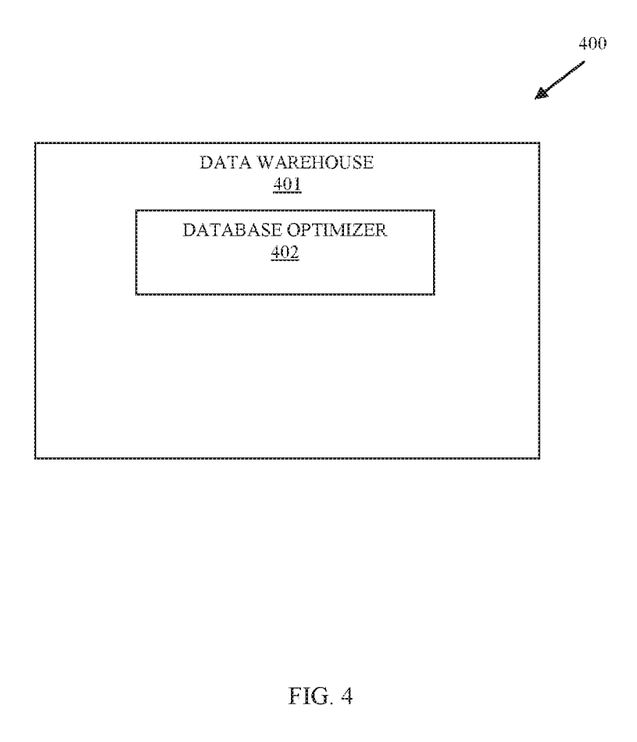
FIG. 4 is a diagram of another system for cost-based optimization processing for join queries with UA views, according to an example embodiment.

FIG. 4 is a diagram of another system 400 for cost-based optimization processing for join queries with UA views, according to an embodiment. The system 400 includes a variety of hardware components and software components. The software components are programmed as executable instructions into memory or a non-transitory computer-readable medium for execution on the hardware components.

The system 400 implements, inter alia, the processing discussed above with the FIGS. 1A-1E and 2-3.

The system 400 includes a data warehouse 401. The data warehouse 401 includes database optimizer 402.

The database optimizer is configured to: 1) execute on at least one hardware processor of a network computing device, 2) develop multiple query execution plans for a query having a UA operation based on logically reorganizing join operations for tables identified in the query, each multiple query execution plan having a different ordering of the join operations from remaining ones of the multiple query execution plans, and 3) provide an optimal query execution plan selected from the multiple query execution plans based on costs associated with the tables to a database engine for execution against the data warehouse.

In an embodiment, the database optimizer 402 is further configured to ignore some of the multiple query execution plans as soon as total costs for those multiple query execution plans exceed a base cost for a base query execution plan derived for the query.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled

The invention claimed is:

1. A method, comprising:
identifying a query with a Union All (UA) operation;
obtaining cost-based processing statistics for branches of the UA operation, wherein the obtaining further includes identifying each of the branches of the UA operation as independent join processing steps, each of the independent join processing steps comprising a unique table view being joined with outer tables in the query;
generating permutations of joins that satisfy each of the independent join processing steps and assigning a total cost to each of the permutations of joins using the cost-based processing statistics;
providing a select one of the permutations of joins that satisfy each of the independent join processing steps having a least total cost as an optimal query execution plan to a database engine for executing the optimal query execution plan against a database; and
outputting results from the optimal query execution plan from the select one of the permutations of joins that satisfy each of the join processing steps to a common spool.

2. The method of claim 1, wherein generating further includes generating a total number of permutations based on join conditions and tables/views associated with the query.

3. The method of claim 2, wherein generating further includes generating at least one of the permutations as a particular join of a connected outer relation with a particular UA view.

4. The method of claim 3, wherein generating further includes generating at least one additional permutation as a first join of the connected outer relations together in a result table and a second join on the result table to one of the UA views.

5. The method of claim 1, wherein generating further includes permitting at least one join to directly access an intermediate spooled table of a previous join avoiding two separate join operations on the intermediate spooled table.

6. The method of claim 5, wherein generating further includes adjusting an order of the joins between an outer relation of the query and branches of a UA view.

7. The method of claim 6, wherein generating further includes adjusting the total costs assigned to the joins with branches of the UA view by factoring out some cost reductions achieved by the permitting and the adjusting.

8. The method of claim 7, wherein generating further includes terminating consideration of an outer table with branches of the UA view when the total costs for some of the branches exceed a base plan cost for a default execution plan of joining the outer table with a UA view spool.

9. The method of claim 1, wherein generating further includes producing some of the permutations between an outer table and the branches of a UA view as multi-step joins.

10. The method of claim 1 further comprising, processing the method as instructions of a database optimizer for the database.

11. A method, comprising:
identifying tables being joined in a query with a Union All (UA) operation;
obtaining database statistics from a database having the tables, wherein the obtaining further includes identifying each of the branches of the UA operation as independent join processing steps, each of the independent join processing steps comprising a unique table view being joined with one or more of the tables;
generating one or more query execution plans for each of the join processing steps based on the database statistics, each of the query execution plans including a unique permutation of join operations on the tables that satisfy each of the join processing steps;
selecting an optimal one of the query execution plans for each of the join processing steps based on costs provided in the database statistics for the tables; and
outputting results from the selected optimal one of the query execution plans for each of the join processing steps to a common spool.

12. The method of claim 11, wherein generating further includes generating a base query execution plan for the query before developing each of the unique permutations and identifying a base cost for the base query execution plan provided in the database statistics.

13. The method of claim 12, wherein generating further includes ignoring consideration of some of the multiple query execution plans when corresponding costs for those multiple query executions plans exceed the base cost for the base query execution plan.

14. The method of claim 11, wherein generating further includes making geography and cost adjustments for each of the unique permutations.

15. The method of claim 14, wherein making further includes reordering outer relations of the unique permutations in making the geography and cost adjustments.

16. The method of claim 11, wherein generating further includes deriving each unique permutation as unique order in which the tables are joined by the join operations and in which results from any join operation is joined with the tables.

17. The method of claim 11 further comprising, providing the optimal query execution plan to a database engine of the database for executing the query in accordance with the optimal query execution plan against the database.

18. A system, comprising:
at least one hardware processor of a network computing device; and
a data warehouse, executed on the at least one hardware processor of a network computing device, and including:
a database optimizer;
wherein the database optimizer is configured to:
i) develop multiple query execution plans for a query having a Union All (UA) operation, wherein:
each of the branches of the UA operation are identified as independent join processing steps, each of the join processing steps comprising a unique table view being joined with tables in the query, based on logically reorganizing join operations for the tables identified in each of the join processing steps, and each of the multiple query execution plans having a different ordering of the join operations in each of the join processing steps from remaining ones of the multiple query execution plans, ii) provide an optimal query execution plan for each of the join processing steps selected from the multiple query execution plans based on costs associated with the tables to a database engine for execution against the data warehouse, and iii) output results from the optimal query execution plan for each of the join processing steps to a common spool.

19. The system of claim 18, wherein the database optimizer is further configured, in i), to ignore some of the multiple query execution plans as soon as total costs for those multiple query execution plans exceed a base cost for a base query execution plan derived for the query.

* * * * *